(12) United States Patent
Yang et al.

(10) Patent No.: US 11,124,282 B2
(45) Date of Patent: Sep. 21, 2021

(54) BIONIC STRATOSPHERIC AIRSHIPS

(71) Applicant: National University of Defense Technology, Hunan (CN)

(72) Inventors: Yueneng Yang, Hunan (CN); Xin Xu, Hunan (CN); Shifeng Zhang, Hunan (CN); Wei Zheng, Hunan (CN); Ye Yan, Hunan (CN); Jianghua Zhou, Hunan (CN)

(73) Assignee: NATIONAL UNIVERSITY OF DEFENSE TECHNOLOGY, Hunan (CN)

( * ) Notice: Subject to any disclaimer, the term of this patent is extended or adjusted under 35 U.S.C. 154(b) by 249 days.

(21) Appl. No.: 16/422,918

(22) Filed: May 24, 2019

(65) Prior Publication Data
US 2019/0359309 A1   Nov. 28, 2019

(51) Int. Cl.
*B64B 1/62* (2006.01)

(52) U.S. Cl.
CPC .................................... *B64B 1/62* (2013.01)

(58) Field of Classification Search
CPC .... B64B 1/02; B64B 1/58; B64B 1/60; B64B 1/62; B64B 1/64; B64B 2201/00
See application file for complete search history.

(56) References Cited

U.S. PATENT DOCUMENTS

| | | | | |
|---|---|---|---|---|
| 2003/0146345 | A1* | 8/2003 | Ogawa | B64B 1/62 244/96 |
| 2005/0224638 | A1* | 10/2005 | Goodey | B64B 1/58 244/30 |
| 2007/0063099 | A1* | 3/2007 | Holloman, Jr. | B64C 1/0009 244/117 R |
| 2013/0037654 | A1* | 2/2013 | Zhang | B64B 1/62 244/31 |

FOREIGN PATENT DOCUMENTS

| | | | |
|---|---|---|---|
| CN | 102673770 A | * | 9/2012 |
| CN | 103963954 B | * | 9/2018 |

* cited by examiner

*Primary Examiner* — Philip J Bonzell
*Assistant Examiner* — Tye William Abell
(74) *Attorney, Agent, or Firm* — Yue (Robert) Xu; Apex Attorneys at Law, LLP

(57) ABSTRACT

The present invention discloses bionic stratospheric airships, related to the technical field of aircraft. The hull shape of the bionic stratospheric airship is obtained by lofting the shape of physalia physalis; one or more buoyancy gasbags, one or more ballonets, and a heat regulating gasbag are provided inside the hull; the buoyancy gasbags are filled with lighter-than-air gas and are provided at an upper layer inside the hull; the ballonets are filled with air and are provided at a lower layer inside the hull; the heat regulating gasbag is provided at a middle layer inside the hull and is filled with a working medium reversibly regulated between a gas state and a liquid state; and a thermodynamic cycle device for heating or pressurizing the working medium is provided inside the heat regulating gasbag.

5 Claims, 2 Drawing Sheets

BIONIC STRATOSPHERIC AIRSHIPS

CROSS REFERENCE TO RELATED APPLICATIONS

This application claims the priority of Chinese Patent Application No. 201810512349.1, filed on May 25, 2018 and titled "BIONIC STRATOSPHERIC AIRSHIPS", the entire disclosure of which is incorporated herein by reference.

TECHNICAL FIELD

The present invention relates to the technical field of aircraft, and in particular, to bionic stratospheric airships.

BACKGROUND

Stratospheric airships, a type of lighter-than-air vehicles in near space, provide effective supplements for current aviation equipment and space systems, and have a wide application prospect in military and civilian fields. Existing technical solutions of stratospheric airships mainly include two categories, i.e., single-gasbag solution and buoyancy gasbag-ballonets solution.

Examples of the single-gasbag solution include the "HiSentinel" airship.

The "HiSentinel" airship has only one buoyancy gasbag. Its buoyancy gasbag freely expanses and compresses during ascent and decent respectively, which does not exchange gas mass with the outside atmospheric. In special situations, buoyancy and pressure can be adjusted slightly by relieving helium or discarding ballast. It lacks the capability of regulating buoyancy and pressure reversibly; therefore, it is difficult to achieve long-term regional station-keeping and altitude control.

Examples of the buoyancy gasbag-ballonets solution include the High Altitude Airship (HAA).

HAA has a buoyancy gasbag and two ballonets, and the ballonets are controlled by blowers and valves to exchange mass with the outside atmospheric, which overcomes the drawback of the single-gasbag solution. However, it has only one solution for regulating flow rate of air mass in the ballonet with the outside atmospheric, such that problems of "super-cold" and "super-hot" cannot be effectively solved. Moreover, air suction and exhaust flow rates of the blowers and valves are limited, and the efficiency of regulating buoyancy and pressure is low. In addition, the hull shape of HAA is an ellipsoid rotary body, large in volume and inertia, and remarkable in aerodynamic damping.

On one hand, the stratospheric airship, called as "thermal aircraft", and its flight dynamics is markedly affected by thermal environment during ascent, station keeping and descent. The thermodynamic state of the inner gas changes continuously due to the coupling effects resulted from the atmospheric pressure, temperature, solar irradiation and infrared radiation.

On the other hand, the stratospheric airship, called as "lighter-than-air aircraft", is filled with huge volume of helium to provide static lifting force, and therefore its flight trajectory and station keeping is markedly affected by the wind disturbances.

In view of the limitations and deficiencies of the above solutions, i.e., single-gasbag solution and buoyancy gasbag-ballonets solution, new concepts and methods of the stratospheric airship design are called for.

"Bionics" is the earliest and simplest way of learning and survival for human beings, and is also an important approach for researchers to learn from nature and obtain inspiration. After millions of years of natural evolution and organic optimization, living bodies acquires excellent survival skills and strong environmental adaptability, which provides a reservoir of inexhaustible knowledge and learning sources for technological innovation. The physalia physalis is a kind of planktonic coelenterates and has special environmental adaptability: its body cavity is filled with a certain volume of gas; its bladder is 9-30 cm long, and gas can be filled into the bladder, so that floating and sinking can be realized by gas filling and discharging; it has multiple bubble-shaped pneumatophores with mediastinum formed inside, and gas glands on inner walls secrete gas for buoyancy and pressure regulation.

INVENTION DESCRIPTION

In order to overcome the deficiencies in the existing stratospheric airship technology, the inventor designs a bionic stratospheric airship by modelling upon the morphological attributes of physalia physalis to reduce aerodynamic damping and improve aerodynamics. The bionic design that combines the buoyancy gasbag ballonet, and heat regulating gasbag increases the efficiency of buoyancy and pressure regulation, and thereby improves the maneuverability of the stratospheric airship and its adaptability to complex environments.

The present invention is achieved through the following technical solution:

a bionic stratospheric airship, where the hull shape is obtained by lofting the shape of physalia physalis; one or more buoyancy gasbags, one or more ballonets; and a heat regulating gasbag are provided inside the hull;

the buoyancy gasbags are filled with lighter-than-air gas and are provided at an upper layer inside the hull;

the ballonets are filled with air and are provided at a lower layer inside the hull;

the heat regulating gasbag is provided at a middle layer inside the hull and is filled with a working medium reversibly regulated between a gas state and a liquid state; and a thermodynamic cycle device for heating or pressurizing the working medium is provided inside the heat regulating gasbag;

preferably, four buoyancy gasbags are evenly distributed inside the hull, and the bottom of each of the buoyancy gasbag is provided with a first valve for gas charging and discharging;

preferably, four ballonets are evenly distributed inside the hull, and the bottom of each of the ballonet is provided with a second valve for gas discharging and an air blower for gas charging;

preferably, the gas with which the buoyancy gasbags are filled is helium;

preferably, an envelope of the hull is made of a high-strength lightweight composite material; preferably, the four buoyancy gasbags and the four ballonets are arranged in sequence end to end from left to right;

lower edges of corresponding sides of the two buoyancy gasbags near two sides of the hull abut lower edges of corresponding sides of the two ballonets near the two sides of the hull;

lower edges of two opposite sides of the buoyancy gasbags in the center of the hull abut lower edges of two opposite sides of the ballonets in the center of the hull; and edges of side walls of the heat regulating gasbag are provided between the two buoyancy gasbags at the two sides of the hull and the two ballonets at the two sides of the hull, and provided in an enclosed space between the buoyancy gasbags in the center of the hull and the ballonets in the center of the hull;

preferably, the working medium with which the heat regulating gasbag is filled is ammonia;

preferably, the thermodynamic cycle device includes a compressing unit configured to convert the working medium from the gas state to the liquid state, and a heating unit configured to convert the working medium from the liquid state to the gas state.

Compared with the prior art, the beneficial effects of the present invention are as follows:

1) the shape of the hull is designed according to the curving shape of a physalia physalis, and compared with the conventional ellipsoid rotary shape and spherical shape, a stratospheric airship designed according to the streamlined profile of the physalia physalis reduces aerodynamic damping and improves aerodynamics;

2) multiple buoyancy gasbags are used and evenly distributed at an upper layer inside the hull; compared with the single-gasbag solution, in which slight buoyancy and pressure regulation is achieved by using a single valve to release helium during ascent and descent, the present invention, where helium is evenly and simultaneously released by the first valves of the multiple evenly distributed buoyancy gasbags, multiplies the mass flow rate of the helium, and therefore, improves the buoyancy and pressure regulation efficiency;

3) the multiple ballonets are used and evenly distributed at a lower layer inside the hull; compared with the buoyancy gasbags and ballonets solution, the present invention is provided evenly with ballonets for mass exchange with the outside atmosphere via the second valves at the bottom, such that the mass flow rate of the air is multiplied, and therefore, the buoyancy and pressure regulation efficiency is improved; and 4) the heat regulating gasbag at a middle layer inside the hull is used; compared with the single-gasbag solution and the solution of buoyancy gasbag-ballonets combination, this new approach enables the working medium, under a super-hot and over-pressure working condition while being converted from a gas state to a liquid state by means of a thermodynamic cycle device, to absorb a large amount of heat and thus, according to the law of thermodynamics, to significantly reduce the volume of the heat regulating gasbag and the intensity of pressure in the process of converting the working medium from the gas state to the liquid state, and under a super-cold working condition while being converted from the liquid state to the gas state by means of the thermodynamic cycle device, to release a large amount of heat and thus, according to the law of thermodynamics, to significantly increase the volume of the heat regulating gasbag and the intensity of pressure in the process of converting the working medium from the liquid state to the gas state, and thereby provides a wider range of the buoyancy and pressure regulation.

Figure 1:
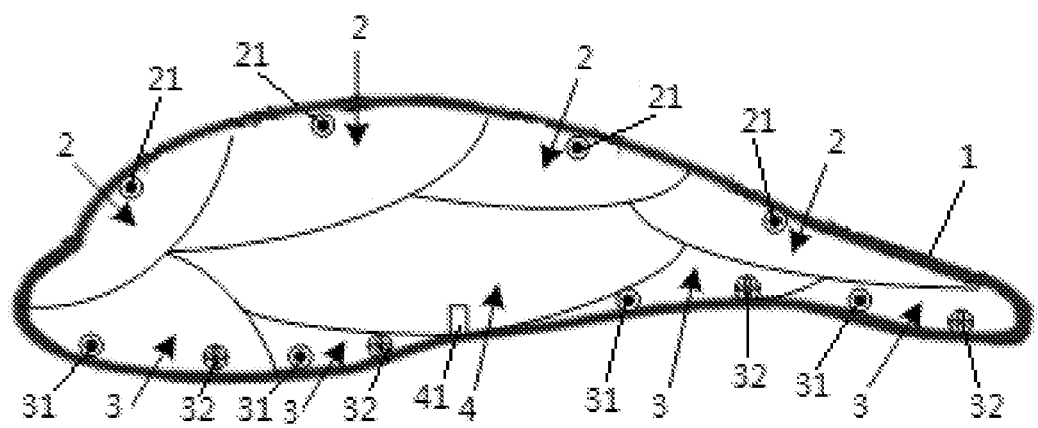
FIG. 1 is a schematic diagram of the shape and composition of a bionic stratospheric airship.

In the drawing: 1: hull; 2: buoyancy gasbag; 21: first valve; 3: ballonet; 31: second valve; 32: air blower; 4: heat regulating gasbag; 41: thermodynamic cycle device.

Figure 2:
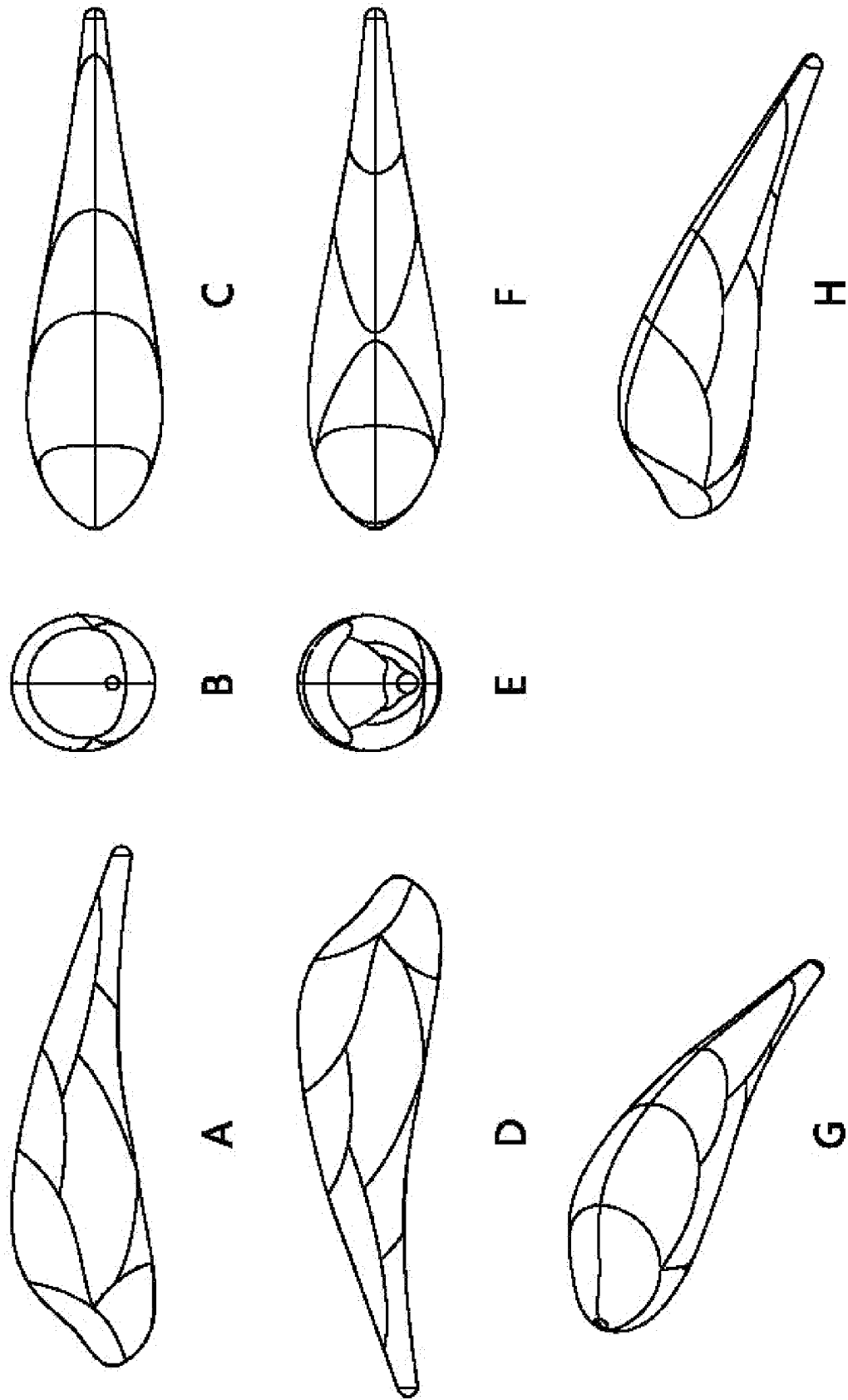

FIG. 2 shows several 3-D views of the bionic stratospheric ship, of which, A is a side view, B is a front view, C is a top view, D is another side view, E is a back view, F is a bottom view, G and H are isometric views.

DETAILED DESCRIPTION

The technical solutions of the present invention are clearly and fully described below with reference to the accompanying drawing. Apparently, the embodiments described herein are for illustrative purpose only and are not exhaustive. All other embodiments derived on the basis of the described embodiments by persons of ordinary skill in the art without involving an inventive effort shall fall within the scope of the present invention.

Embodiment 1

As illustrated in FIG. 1, in a bionic stratospheric airship, the hull shape of the stratospheric airship is obtained by lofting the shape of physalia physalis, four buoyancy gasbags 2 evenly distributed at an upper layer inside the hull 1, four ballonets 3 evenly distributed at a lower layer inside the hull 1, and one heat regulating gasbag 4 located at a middle layer inside the hull 1 is provided inside the hull 1. The buoyancy gasbags 2 are filled with helium, so as to enhance the buoyancy of the hull 1. Closing the first valves 21 can ensure the interior airtightness of the buoyancy gasbags 2. Opening the first valves 21 can reduce the buoyancy of the hull 1 by releasing helium. The air blowers 32 in the ballonets 3 can fill the ballonets 3 with air to increase the total weight of the airship, which means to reduce the buoyancy. Closing the second valves 31 can ensure the interior airtightness of the ballonets 3. Opening the second valves 31 can reduce the total weight of the hull by releasing the air, which means to increase the buoyancy. The heat regulating gasbag 4 is filled with a working medium reversibly regulated by the thermodynamic cycle device 41, and the interior of the heat regulating gasbag 4 is an enclosure.

Under a super-hot and over-pressure working condition, a compressing unit of the thermodynamic cycle device 41 converts the working medium from a gas state to a liquid state. In the process of conversion from the liquid state to the gas state; the working medium can absorb a large amount of heat, so that the volume and the internal pressure of the heat regulating gasbag 4 are reduced according to the law of thermodynamics, to balance the internal pressure of the bionic stratospheric airship and reduce its total buoyancy. The thermodynamic cycle device 4 is controlled to pressurize the working medium, and thus to realize the pressure and buoyancy regulation. If the outside environment of the bionic stratospheric airship changes and the bionic stratospheric airship is about to ascend while stopping station-keeping, the state of the bionic stratospheric airship can be adjusted by means of the thermodynamic cycle device 41 in time, so that the stratospheric airship can perform missions during its station-keeping.

Under a super-cold working condition, a heating unit of the thermodynamic cycle device 41 converts the working medium from the liquid state to the gas state. In the process of conversion from the gas state to the liquid state, the working medium can release a large amount of heat, so that the volume and the internal pressure of the heat regulating gasbag 4 are increased according to the law of thermodynamics, to make up for the decreased internal pressure of the bionic stratospheric airship and enhance the total buoyancy of the bionic stratospheric airship. The thermodynamic cycle device 41 is controlled to heat the working medium, and thus to regulate the pressure and buoyancy of the bionic stratospheric. If the outside environment of the bionic stratospheric airship changes and the bionic stratospheric airship is about to descend while stopping station-keeping, the state of the bionic stratospheric airship can be adjusted by means of the thermodynamic cycle device 41 in time, so that the bionic stratospheric airship can be maintained static to perform missions stably.

By means of inflation and deflation of buoyancy gasbags 2 and ballonets gasbags 3, as well as reversible regulation of the working medium in the heat regulating gasbag 4, the buoyancy and pressure of the bionic stratospheric airship can be effectively regulated.

The embodiment described above is merely a preferred embodiment of the present invention. The scope of protection of the present invention is not limited thereto, and any technical solution based on the present inventive concept falls within the scope of protection of the present application. It should be noted that many improvements and modifications can be made by persons of ordinary skills in the art without departing from the principle of the present invention, and those improvements and modifications should also be regarded as falling within the scope of protection of the present invention.

The invention claimed is:

1. A bionic stratospheric airship, comprising:
a hull, wherein the hull comprises a shape resembling a shape of physalia physalis; one or more buoyancy gasbags, one or more ballonets, and a heat regulating gasbag provided inside the hull; wherein
the buoyancy gasbags are filled with lighter-than-air gas and are provided at an upper layer inside the hull;
the ballonets are filled with air and are provided at a lower layer inside the hull;
the heat regulating gasbag is provided at a middle layer inside the hull and is filled with a working medium reversibly regulated between a gas state and a liquid state; and
a thermodynamic cycle device for heating or pressurizing the working medium is provided inside the heat regulating gasbag;
the buoyancy gasbags comprise four buoyancy gasbags evenly distributed inside the hull, the bottom of each buoyancy gasbag provided with a first valve for gas charging and discharging;
the ballonets comprise four ballonets evenly distributed inside the hull, the bottom of each of the ballonets provided with a second valve for deflating the ballonet and an air blower for inflating the ballonet; wherein:
the four buoyancy gasbags and the four ballonets are arranged in sequence end to end from left to right;
lower edges of corresponding sides of the two buoyancy gasbags near two sides of the hull abut lower edges of corresponding sides of the ballonets near the two sides of the hull;
lower edges of two opposite sides of the buoyancy gasbags in the center of the hull abut lower edges of two opposite sides of the ballonets in the center of the hull; and
edges of side walls of the heat regulating gasbag are located between the two buoyancy gasbags at the two sides of the hull and the two ballonets at the two sides of the hull, the heat regulating gasbag encompassing an enclosed space between the buoyancy gasbags in the center of the hull and the ballonets in the center of the hull.

2. The bionic stratospheric airship according to claim 1, wherein the gas with which the buoyancy gasbags are filled is helium.

3. The bionic stratospheric airship according to claim 2, wherein the envelope of the hull is made of a composite material.

4. The bionic stratospheric airship according to claim 1, wherein components of the working medium with which the heat regulating gasbag is filled is ammonia.

5. The bionic stratospheric airship according to claim 4, wherein the thermodynamic cycle device comprises a compressing unit configured to convert the working medium from the gas state to the liquid state, and a heating unit configured to convert the working medium from the liquid state to the gas state.

* * * * *